United States Patent [19]
Noroozian

[11] Patent Number: 5,909,105
[45] Date of Patent: Jun. 1, 1999

[54] CONTROL OF POWER NETWORKS

[75] Inventor: Mojtaba Noroozian, Västerås, Sweden

[73] Assignee: Asea Brown Boveri AB, Vasteras, Sweden

[21] Appl. No.: 08/780,776

[22] Filed: Jan. 9, 1997

[30] Foreign Application Priority Data

Jan. 18, 1996 [SE] Sweden .................................. 9600172

[51] Int. Cl.⁶ ...................................................... G05F 1/70
[52] U.S. Cl. ........................... 323/211; 323/210; 307/105
[58] Field of Search .................................. 323/208, 209, 323/210, 211; 307/98, 99, 105

[56] References Cited

U.S. PATENT DOCUMENTS

| | | | |
|---|---|---|---|
| 4,434,376 | 2/1984 | Hingorani ................................ | 307/102 |
| 4,724,333 | 2/1988 | Hedin ..................................... | 307/105 |
| 4,999,565 | 3/1991 | Nilsson ................................... | 323/210 |
| 5,032,738 | 7/1991 | Vithayathil .............................. | 307/112 |
| 5,291,120 | 3/1994 | Leowald et al. ......................... | 323/209 |
| 5,367,197 | 11/1994 | Klerfors .................................. | 307/105 |

OTHER PUBLICATIONS

Noroozian et al., Damping Of Power System Oscillations By Use Of Controllable Components, IEEE Transactions On Power Delivery, vol. 9, No. 4, Oct. 1994, pp. 2046–2054.
Olwegård et al., Improvement of Transmission Capacity By Thyristor Controlled Reactive Power, IEEE Transactions on Power Apparatus And Systems, vol. PAS–100, No. 8, Aug. 1981, pp. 3930–3939.
Gronquist et al., Power Oscillation Damping Control Stategies For Facts Devices Using Locally Measurable Quantities, IEEE Transactions On Power Systems, vol. 10, No. 3, Aug. 1995, pp. 1598–1605.
Angquist et al., Power Oscillation Damping Using Controlled Reactive Power Compensation A Comparison Between Series And Shunt Approaches, IEEE Transactions On Power Systems, vol. 8, No. 2, May 1991, pp. 687–700.

*Primary Examiner*—Shawn Riley
*Attorney, Agent, or Firm*—Law Offices Pollock, Vande Sande & Amernick

[57] ABSTRACT

In an apparatus for control of controller equipment for damping power oscillations in a power line, the controller equipment is serially connected between a first connection point and a second connection point in the power line in an electric network for alternating current. The controller equipment is adapted to serially generate in the power line, dependent on a control order, a damping voltage for damping power oscillations in the power line. Controlling equipment receives sensed quantities of the power network and forms a phase deviation dependent on these quantities. The phase deviation is the difference between a phase angle of a first voltage at the first connection point and a phase angle of a second voltage at the second connection point. The controlling equipment forms the control order dependent on the time rate of change of a function of the phase deviation. The control order controls the controller equipment to generate the damping voltage which feeds an active power in the power line counteracting changes in active power in the power line which are associated with power oscillations.

16 Claims, 10 Drawing Sheets

CONTROL OF POWER NETWORKS

TECHNICAL FIELD

The present invention relates to a device for control of controller equipment intended for serial connection between a first and a second connection point in a power line in an electric power network for alternating current, the controller equipment being adapted, in dependence on a control order supplied thereto, to serially generate a voltage in the power line for the purpose of damping power oscillations therein. The device comprises a control member arranged in controlling equipment for generating the control order.

BACKGROUND ART

In an electric power line with two nodal points, interconnected by a power line which is often long, the power transmitted in the power line is dependent on the difference in phase angle between the voltages at the respective nodal points. This angular difference is constant when the power network is in an equilibrium state, but after a disturbance, for example a transient fault in the power line or a change of the power conditions at one of the two nodal points, a new equilibrium state must be created. The change from one equilibrium state to another takes place via a low-frequency transient oscillation in the above-mentioned angular difference and hence a corresponding oscillation in the power transmitted in the power line. The power oscillation, which usually has a weak damping and the frequency of which is of the order of magnitude of 1 Hz, is determined by the dynamic properties in the electromechanical system which consists of the power line and the power network, including rotating machines connected thereto.

In order to achieve damping of detected power oscillations in power networks, different kinds of controllable controller equipment and control laws have been proposed. Examples of such controller equipment for connection in series with a power line are the so-called unified power-flow controllers (UPFC), phase angle regulators (PAR), and controllable, for example thyristor-connected, series-capacitors (CSC). Controller equipment for connection in shunt connection to a power line are, for example, static var compensators for reactive power (SVC) and static condensers (STATCON) comprising controllable converters.

The term FACTS (Flexible AC Transmission Systems) has become common to designate power networks comprising at least some of the above-mentioned controllable controller equipment.

Å Ölwegård et al: Improvement of Transmission Capacity by Thyristor Controlled Reactive Power [IEEE Trans. on Power App. and Systems, Vol. PAS-100. No. 8 August 1981, pp 3930–3939] describes the application of thyristor-connected capacitor banks in both shunt- and series-connection for damping power oscillations between power systems connected by a power line. A control law based on sensing the transmitted active power on the power line is proposed for the series-connected capacitor bank. The control law means, in principle, that when the time rate of change of the transmitted power is positive and exceeds a certain level, the whole capacitor bank is connected into the power line. When the power reaches its maximum value, the switchable part of the capacitor bank is bypassed, whereupon, when the power reaches its minimum value, the whole capacitor bank is again connected into the power line. It is stated that the proposed control law has certain deficiencies in that, in systems have a plurality of power lines and thyristor-connected series capacitors, these interfere with each other. A control law common to all series capacitors would, therefore, be preferable, but is considered unrealistic because of the technical difficulties in transferring the control law to each of the series capacitors.

Also studies of two-machine systems interconnected by parallel power lines have shown that the choice of the active power as starting-point for a control law exhibits certain deficiencies.

James F. Gronquist et al: Power Oscillation Damping Control Strategies for FACTS Devices using locally measureable Quantities [IEEE Trans. on Power App. and Systems, Vol. 10. No. 3 August 1995, pp 1598–1605] describes the use of energy functions for deriving control laws for thyristor-controlled series capacitors (TCSC), static compensators (SVC) for reactive power, static condensers (STATCON) and thristor-controlled phase-shifting transformers (TCPS) for the purpose of damping power oscillations in and between power networks. So-called unified power flow controllers (UPFC) serially connected in power lines are not discussed and the control laws derived by derivation of the energy function with respect to time are described in abstract form.

L Ängquist et al: Power Oscillation Damping using Controlled Reactive Power Compensation—a Comparison between Series and Shunt Approaches [Trans. on Power App. and Systems, Vol. 8. No. 2 May 1993, pp 687–700] deals with damping of power oscillations of the above-mentioned kind and demonstrates that controlled series-capacitors (CSC) provide a better damping effect than static shunt-connected compensators for reactive power. It is found, especially for two-machine systems, that a power oscillation gives rise to a sinusoidal deviation in the angular difference of the two machines which is superordinate to its stationary value. Regarding control laws, it is stated in general terms that the controller equipment is to supply an active power such that an additional torque is created with opposite sign in relation to the time rate of change of the angular difference. An example given shows that angle in these cases means the mechanical angle of rotation of the machines, that is, the time rate of change of the angular difference is, in this case, the same as the difference in speed between the two machines. This control law, which is thus based on measuring speed differences, cannot be simply extended to power networks with more than two machines.

M. Noroozian et al: Damping of Power Systems Oscillations by use of Controllable Components [IEEE Trans. on Power Delivery, Vol. 9. No. 4 October 1994, pp 2046–2054] describes damping of power oscillations based on a linearized model of a power system and demonstrates that controlled series-capacitors (CSC) provide a better damping effect than static shunt-connected compensators for reactive power and, to attain the same damping properties, a controlled series capacitor may be dimensioned for a lower power than a so-called phase angle regulator (PAR).

There is a need to derive concrete and appropriate control laws for controller equipment for serial connection to a power line in order to make a fast and cost-effective damping of power oscillations possible.

SUMMARY OF THE INVENTION

The object of the invention is to provide a device which makes a fast and cost-effective damping of power oscillations in a power network possible.

Control laws according to the invention are based on values of sensed quantities in the power network, which values occur at the controller equipment.

BRIEF DESCRIPTION OF THE DRAWINGS

The invention will be explained in greater detail by description of embodiments with reference to the accompanying drawings, wherein.

DESCRIPTION OF THE PREFERRED EMBODIMENTS

In the following, complex quantities (vector quantities) are denoted with a stroke over their designation and the magnitude (the amplitude) of the corresponding quantity is denoted without a stroke over the designation. For example, a voltage is designated $\overline{V}_i$ when both its amplitude and its phase angle are referred to, whereas the magnitude of the corresponding voltage is designated $V_i$.

Figure 1:
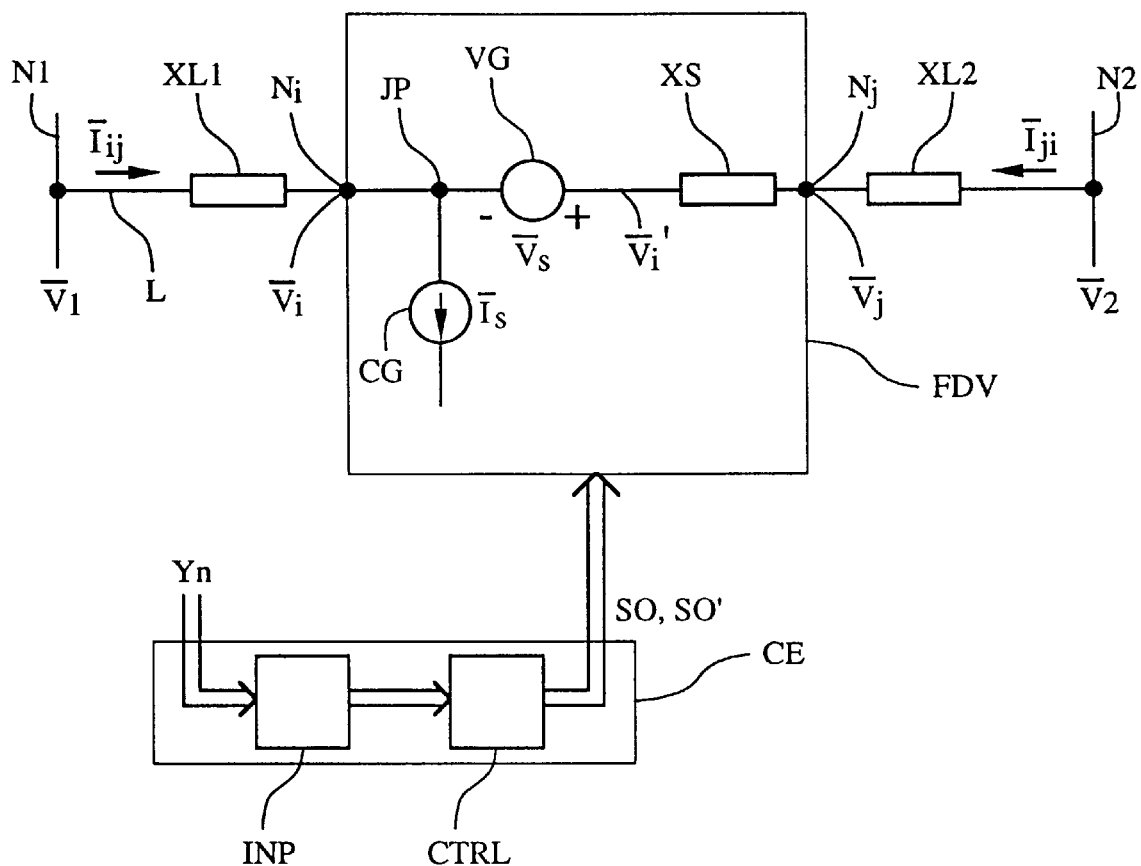
FIG. 1 shows schematically as a single-line diagram part of an electric power network with controller equipment according to the invention.

FIG. 1 shows part of an electric power network for a three-phase alternating voltage with the angular frequency ω. The power network is marked with a first nodal point N1 and a second nodal point N2, which are interconnected by a power line L. Controller equipment FDV, which will be described below, is serially connected in the power line L between a first connection point $N_i$ and a second connection point $N_j$. The impedance of the power line between the first nodal point and the first connection point is marked with an impedance element XL1 and the impedance between the second nodal point and the second connection point with an impedance element XL2. The controller equipment comprises a current generator CG, connected in a shunt connection to the power line L at a connection point JP on the power line, and a controllable voltage generator VG, connected in the power line between the first and the second connection point $N_i$ and $N_j$, respectively. A current $\overline{I}_s$ flows through the current generator, and the voltage generator generates a voltage $\overline{V}_s$, which voltage thus occurs serially in the power line. The impedance of the voltage generator is designated $\overline{X}_s$ and is marked in the figure with an impedance element XS.

At the nodal point N1, the current $\overline{I}_{ij}$ flows into the power line and at the nodal point N2 the current $\overline{I}ji$ flows into the power line. The voltage at the first nodal point N1 is designated $\overline{V}_1$, its amplitude $V_1$ and its phase angle $\theta_1$. The amplitude and phase angle for the voltage $\overline{V}_2$ at the second nodal point are designated $V_2$ and $\theta_2$ and for the voltages $\overline{V}_i$ and $\overline{V}_j$ at the first and second connection points they are designated $V_i$, $\theta_i$ and $V_j$, $\theta_j$, respectively. The voltage at a point on the power line between the voltage generator and the impedance element XS is designated $\overline{V}_i'$.

Controlling equipment CE comprises a control member CTRL, which generates a control order SO. The control order is supplied to the voltage generator for control of the voltage $\overline{V}_S$. The controlling equipment further comprises an input member INP, which is supplied with measured values Yn of quantities sensed in the power network, which measured values will be described in greater detail below. The measured values are formed in some known manner by measuring devices, not shown in the figure. The control member generates the control order in dependence on quantities supplied from the input member, which are either directly sensed in the power network or calculated therefrom.

Figure 2:
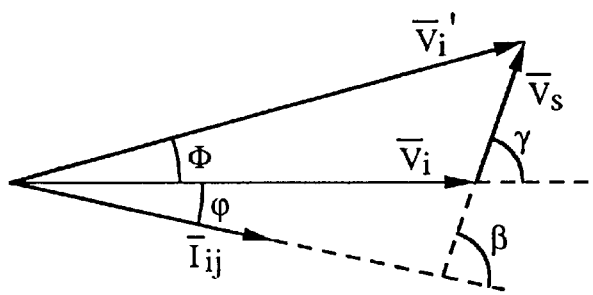
FIG. 2 shows in the form of a vector diagram the relationship between some different electrical quantities in a power network according to FIG. 1.

FIG. 2 shows a vector diagram of the voltages $\overline{V}_i$, $\overline{V}_s$ and $\overline{V}_i'$ as well as the current $\overline{I}_{ij}$. The voltage $\overline{V}_s$ forms the angle γ with the voltage $\overline{V}_i$ and the angle β with the current $\overline{I}_{ij}$. The voltage $\overline{V}_i'$ forms the angle Φ with the voltage $\overline{V}_i$.

Figure 3:
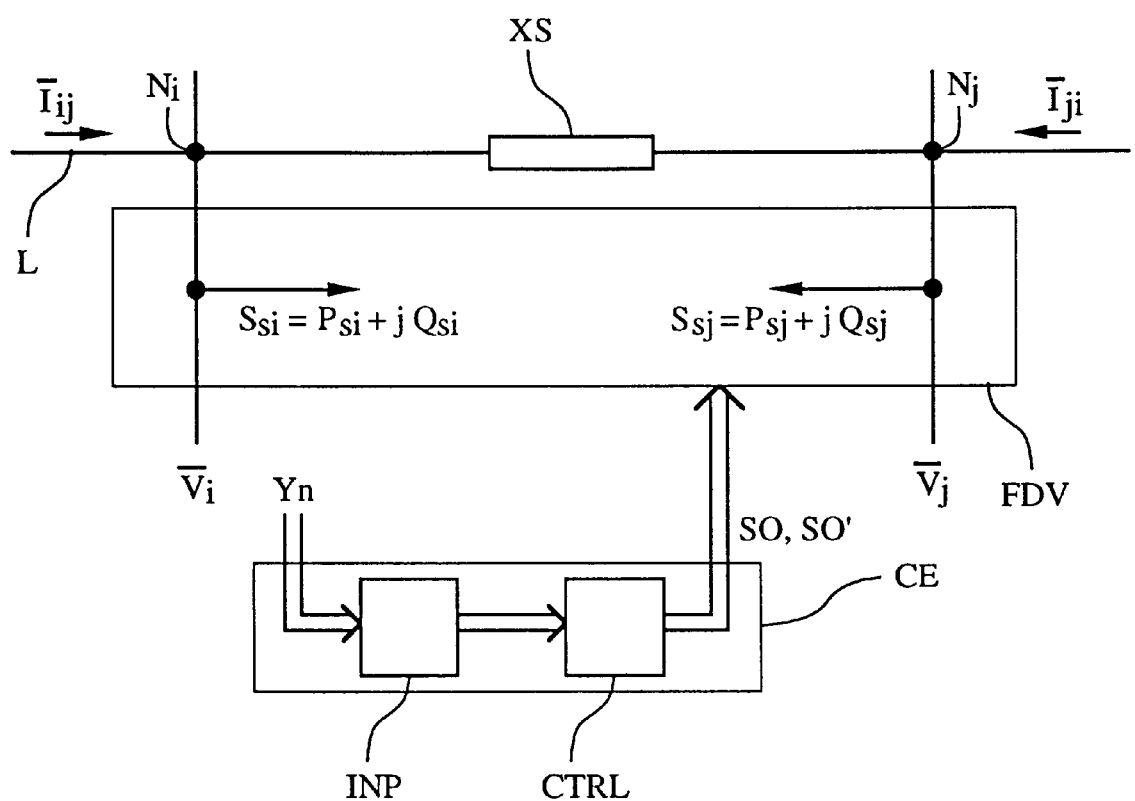
FIG. 3 shows an alternative model of a power network according to FIG. 1.

It is known that the part of the power network shown in FIG. 2 corresponds to a model according to FIG. 3, in which the current generator CG and the voltage generator VG in FIG. 1 are replaced, respectively, by a controllable apparent power $S_{si}=P_{si}+jQ_{si}$ supplied at the connection point $N_i$ and a controllable apparent power $S_{sj}=P_{sj}+jQ_{sj}$ supplied at the connection point $N_j$. $P_{si}$ and $P_{sj}$, respectively, here designate active power and reactive power, $Q_{si}$ $Q_{sj}$, respectively, at the respective connection points. As will be shown below, these powers may be expressed as functions of the voltages $\overline{V}_i$, $\overline{V}_j$ and $\overline{V}_s$, the impedance $\overline{X}_s$ and the angle γ, whereby these functions will have different forms depending on the embodiment in which the controller equipment is implemented.

Figure 4:
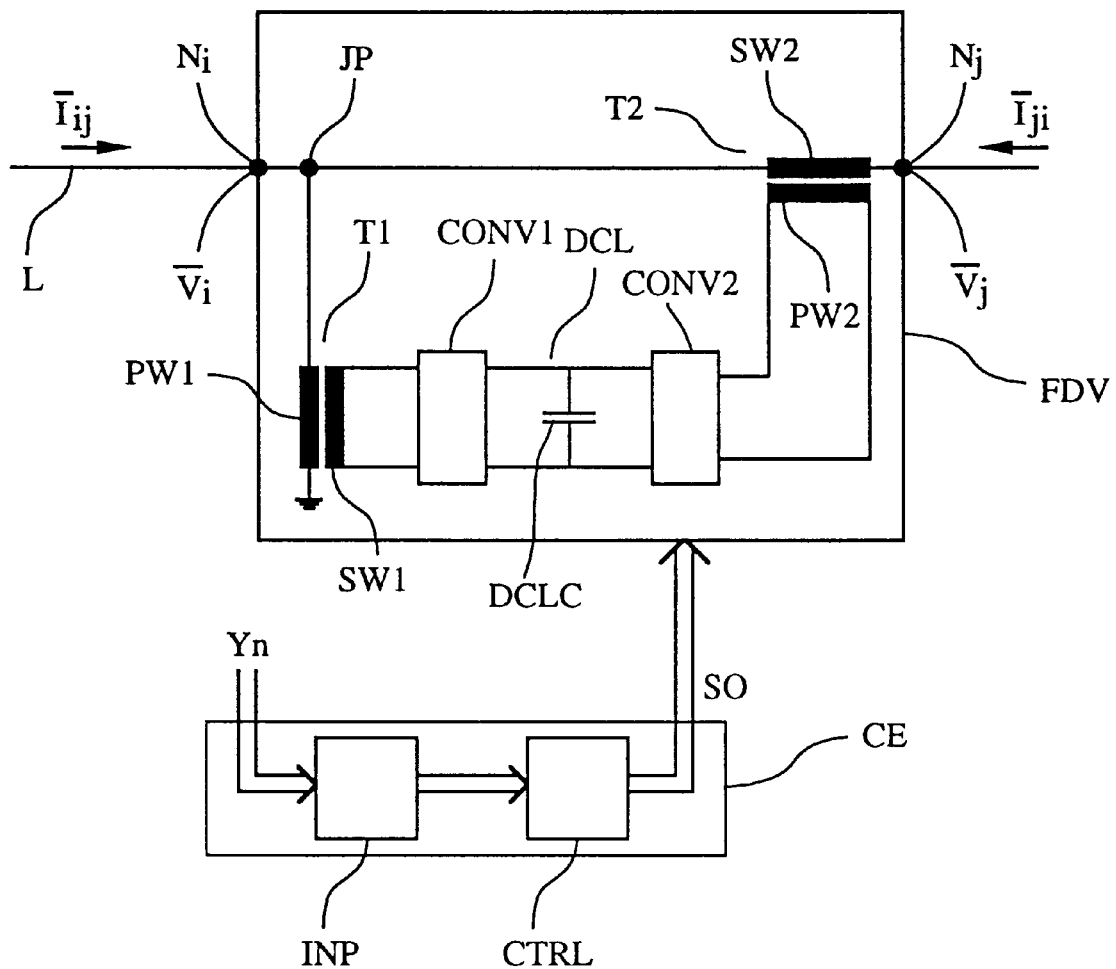
FIG. 4 shows schematically as a single-line diagram a first embodiment of controller equipment according to FIG. 1.

In a first embodiment of the invention, the controller equipment comprises a so-called unified power flow controller (UPFC), of a type known, one embodiment of which is shown schematically in FIG. 4. The current generator CG in FIG. 1 corresponds to a transformer T1, the primary winding PW1 of which is connected in shunt connection to the power line L at the connection point JP and the secondary winding SW1 of which is connected to the ac terminals of a converter CONV1. The voltage generator VG corresponds to a transformer T2, the primary winding PW2 of which is connected to the ac terminals of a converter CONV2 and the secondary winding SW2 of which is connected serially in the power line L between the connection points $N_i$ and $N_j$. The converters are of a design known and of a self-commutated voltage-source type. Dc terminals on the converter CONV1 are connected to corresponding dc terminals on the converter CONV2 via a direct-voltage intermediate link DCL comprising a capacitor DCLC. The output voltage of the converter CONV2 is controlled with respect to magnitude and phase angle relative to the voltage $\overline{V}_i$, in some manner known, for example by pulse-width modulation, in dependence on the control order SO, generated in a manner which has been described with reference to FIG. 1 and which will be further described below. The converter CONV1 is controlled in some manner known such that it delivers to the direct-voltage intermediate link an active power equal to that consumed by the converter CONV2 (and is forwarded to the transformer T2). For the purpose of the invention, its reactive power may be controlled to a value equal to zero. The output voltage of the converter CONV2 is introduced in the power line L as the voltage $\overline{V}_s$ via the transformer T2.

In this first embodiment of the invention, the following expressions, known per se, of the powers $P_{si}$, $P_{sj}$, $Q_{si}$ and $Q_{sj}$ are obtained $$P_{si}=-P_{sj}=rb_sV_iV_j\sin(\theta_i-\theta_j+\gamma) \qquad (1a)$$

$$Q_{si}=rb_sV_i^2\cos\gamma \qquad (1b)$$

$$Q_{sj}=-rb_sV_iV_j\cos(\theta_i-\theta_j+\gamma) \qquad (1c)$$

where $b_s$ designates the susceptance of the voltage generator, $$b_s=1/X_s, \qquad (2a)$$

and r designates the amplitude of the voltage $\overline{V}_s$ relative to the voltage in the first connection point, expressed as the quotient of the absolute value of the amplitude of $\overline{V}_s$ and the absolute value of the amplitude of $\overline{V}_i$, $$r=V_s/V_i \qquad (2b)$$

By the dimensioning of the components included in the controller equipment, the relative amplitude r is limited to a first upper limiting value $r_{max}$, typically of the order of magnitude of 0.1. A first upper limiting value $V_{smax}$ in voltage for the voltage $\overline{V}_s$ corresponds to the value $r_{max}$, which voltage $\overline{V}_s$ is thus controllable in amplitude relative to the first upper limiting value $V_{smax}$.

Figure 5:
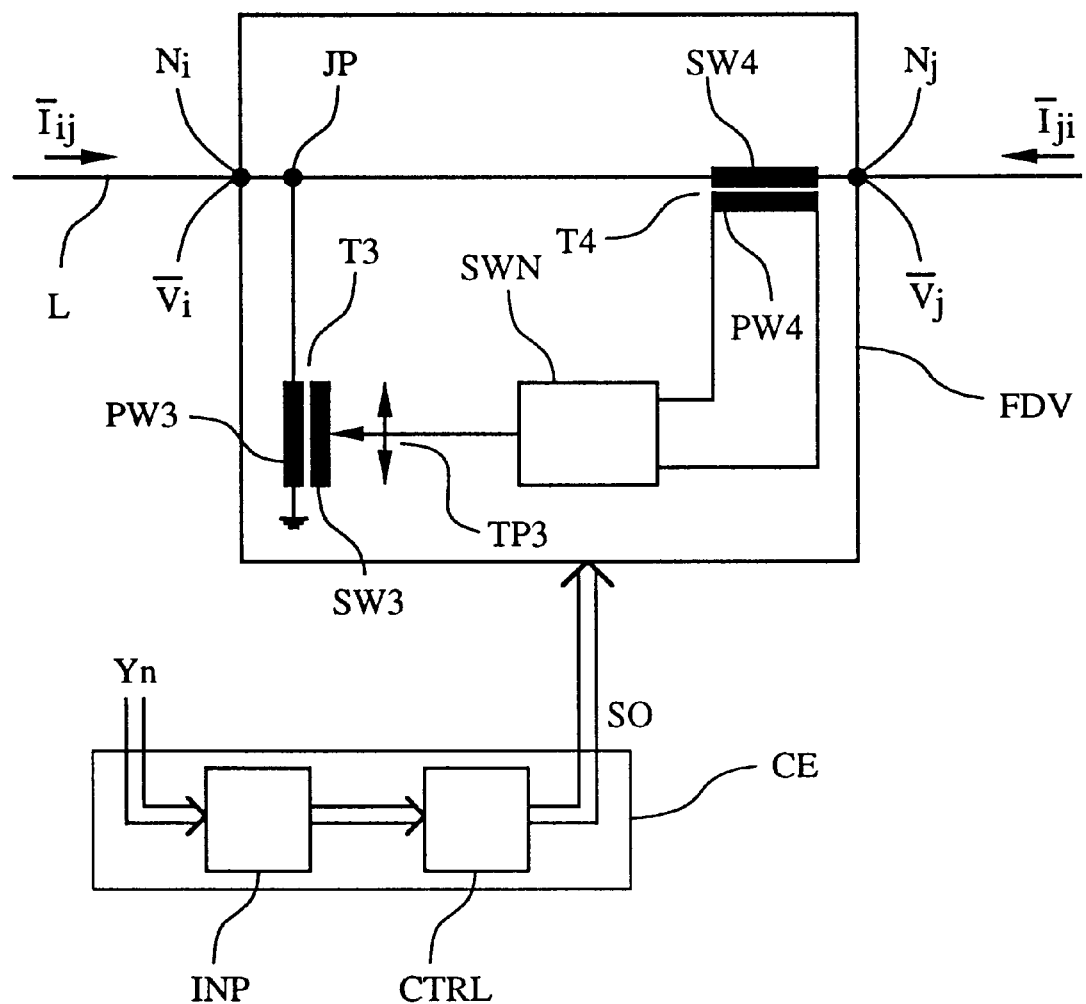
FIG. 5 shows schematically as a single-line diagram a second embodiment of controller equipment according to FIG. 1.

In a second embodiment of the invention, the controller equipment comprises a so-called phase angle regulator, (PAR), of a type known, one embodiment of which is shown in FIG. 5. The current generator CG in FIG. 1 corresponds to a voltage transformer T3, the primary winding PW3 of which is connected in a shunt connection to the power line L at the connection point JP and the secondary winding SW3 of which, which is provided with controllable tapping points TP3, in the figure only symbolically marked with an arrow, for tapping of a variable secondary voltage, is connected to a switching member SWN. The voltage generator VG corresponds to a transformer T4, the secondary winding SW2 of which is connected serially in the power line L between the connection points $N_i$ and $N_j$. The switching member SWN is adapted, in a known manner, in dependence on the control order SO, generated in a manner described with reference to FIG. 1 and which will be described further below, to connect the secondary voltage from the transformer T3 to a primary winding PW4 on the transformer T4 in such a way that part of a line voltage in one of the phases of the ac network, via the transformers T3 and T4, is introduced in the power line L as the voltage $\overline{V}_s$ in another one of the phases of the ac network. The control order SO also influences the tapping points, in some known manner, for tapping of a variable secondary voltage from the secondary winding SW3. The voltage $\overline{V}_s$ is thereby controlled in magnitude, in dependence on the control order, relative to the voltage $\overline{V}_i$ at the first connection point, whereas its phase angle $\gamma$ relative to this voltage is controlled to assume one of the values $\pm\pi/2$ (FIG. 2).

In this second embodiment of the invention, the following expressions, known to one skilled in the art, of the powers $P_{si}$, $P_{sj}$, $Q_{si}$ and $Q_{sj}$ are obtained:

$$P_{si}=-P_{sj}=rb_sV_iV_j\sin(\theta_i-\theta_j+\gamma) \qquad (3a)$$

$$Q_{si}=-rb_sV_iV_j\cos(\theta_i-\theta_j+\gamma)+r^2b_sV_i^2 \qquad (3b)$$

$$Q_{sj}=-rb_sV_iV_j\cos(\theta_i-\theta_j+\gamma) \qquad (3c)$$

Figure 6A:
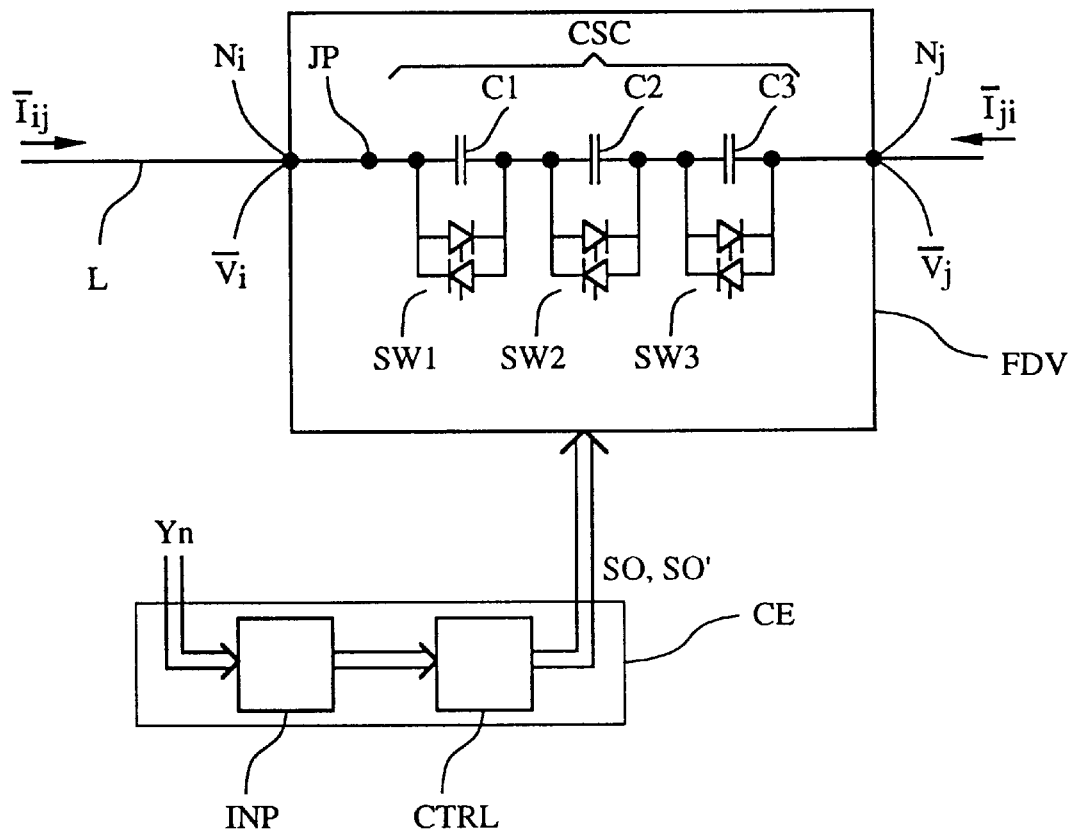
FIG. 6A shows schematically as a single-line diagram a third embodiment of controller equipment according to FIG. 1.

In a third embodiment of the invention, the controller equipment comprises a controllable series capacitor CSC, of a type known, one embodiment of which is shown schematically in FIG. 6A. In this embodiment, the current generator CG in FIG. 1 corresponds to an infinite impedance, that is, the current $\overline{I}_s$ is zero, and the voltage generator VG corresponds to the series-capacitor equipment CSC, which in the power line L serially generates a voltage $\overline{V}_s=\overline{I}_{ij}*\overline{X}_c$, where $\overline{I}ij$ is the current through the power line and $\overline{X}_c$ is the impedance of the series-capacitor equipment.

The series-capacitor equipment comprises a number of mutually series-connected capacitors C1, C2, C3, which are all connected in the power line L between the connection points $N_i$ and $N_j$. In parallel with each of the capacitors C1, C2 and C3, switching members SW1, SW2 and SW3, respectively, are arranged in a known manner, each one comprising two thyristors in anti-parallel connection.

The impedance of the capacitor equipment may be controlled in magnitude $X_c$, in a known manner, between a minimum value $X_{cminc}=0$, and a maximum value $X_{cmaxc}=Kc*X_{FC}$, where $X_{FC}$ is a chosen impedance value, for example corresponding to the impedance of a series capacitor CF (not shown in the figure) permanently connected into the power line CF. The control is performed in dependence on a control order SO, generated in the manner which has been described with reference to FIG. 1 and which will be further described below, which supplies a firing order to control circuits (not shown in the figure) for the switching members and where the factor Kc is a proportionality factor which can be regarded as an amplification factor. The value $X_{cminc}$ is obtained when all the capacitors are bypassed and the value $X_{cmaxc}$ is obtained when all the capacitors are connected into the power line.

The voltage $\overline{V}_s$ in the power line L, at a given current $\overline{I}ij$, is controllable in magnitude by connection and disconnection of the capacitors C1, C2 and C3, which connections and disconnections take place in dependence on the control order SO. Its relative amplitude r is thus, at a given current $\overline{I}ij$, $r=I_{ij}*X_c/V_i$ and its upper limiting value, also at a given current, is $r_{maxc}=I_{ij}*Kc*X_{FC}/V_i$. In this embodiment the relative amplitude r also, at a given current, has a natural lower limiting value $r_{minc}=0$, corresponding to a situation where all the capacitors C1–C3 have been bypassed. The voltage $\overline{V}_s$ forms the angle $\beta=-\pi/2$ with the current $\overline{I}ij$ (FIG. 2). The voltage $\overline{V}_s$ can thus, at a given current $\overline{I}ij$, assume a first control value, the phase angle $\beta$ of which has the value $-\pi/2$ relative to the current and the amplitude $V_s$ of which is controllable in relation to a first upper limiting value $V_{smaxc}=I_{ij}*Kc*X_{FC}$. The first upper limiting value in voltage, $V_{smaxc}$, corresponds to a first upper limiting value $X_{cmaxc}$ in impedance of a capacitive nature, $X_{cmaxc}=Kc*X_{FC}$, the impedance $X_c$ of the controller equipment being controllable in relation to the first upper limiting value $X_{cmaxc}$.

In this third embodiment of the invention, the following expressions, known to one skilled in the art, of the powers $P_{si}$, $P_{sj}$, $Q_{si}$ and $Q_{sj}$ are obtained $$P_{si}=[K_{cs}bs/(1-K_{cs})]*V_iV_j\sin(\theta_i-\theta_j) \quad (4a)$$

$$Q_{si}=[K_{cs}bs/(1-K_{cs})]*[V_i^2-V_iV_j\cos(\theta_i-\theta_j)] \quad (4b)$$

$$P_{sj}=[K_{cs}bs/(1-K_{cs})]*V_iV_j\sin(\theta_j-\theta_i) \quad (4c)$$

$$Q_{sj}=[K_{cs}bs/(1-K_{cs})]*[V_j^2-V_iV_j\cos(\theta_j-\theta_i)] \quad (4d)$$

where $K_{cs}$ is a proportionality factor, $K_{cs}=X_c/X_s$, and $X_c$ is the impedance of the series-capacitor equipment. The impedance $X_s$ in this cases consists of the impedance of the series-capacitor equipment between the connection point $N_i$ and the capacitor C1 plus its impedance between the capacitor C3 and the connection point $N_j$.

Figure 6B:
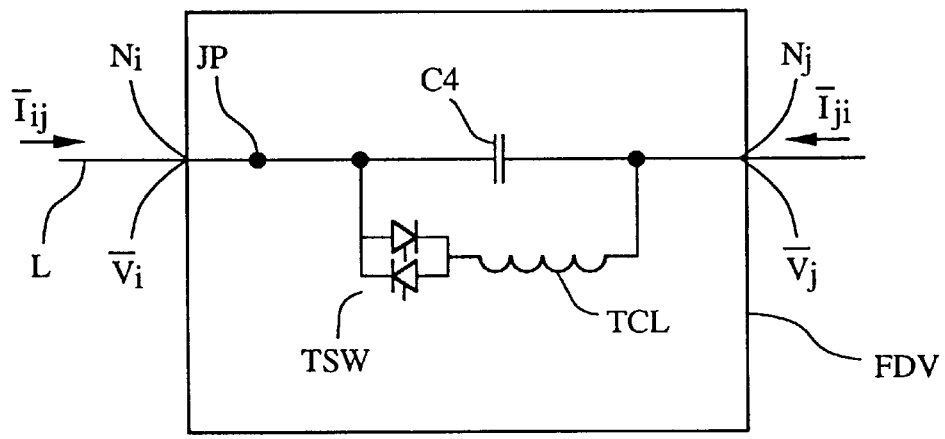
FIG. 6B shows schematically as a single-line diagram a fourth embodiment of controller equipment according to FIG. 6A.

In a fourth embodiment of the invention, the controller equipment according to FIG. 6A can be alternatively designed as continuously controlled series-capacitor equipment, of a type known, according to FIG. 6B. This Figure shows only the controller equipment which is connected to the power line in a manner similar to the controller equipment according to FIG. 6A. A capacitor C4 is connected in parallel with a reactor TCL series-connected to a thyristor switching device TSW. The thyristor switching device comprises two thyristors in anti-parallel connection and by means of phase-angle control of the thyristor switching device the impedance of the controller equipment, and hence the voltage $V_s$ between the connection points $N_i$ and $N_j$, may be controlled continuously and also be brought to make an angle $\beta>0$ (corresponding to the impedance of the controller equipment being of an inductive nature) with the current $\bar{I}_{ij}$. In this embodiment, $X_c$ designates the impedance of the parallel connection of the capacitor C4 and the reactor TCL, whereby the impedance exhibited by the reactor is a function of the control angle of the thyristor switching device TSW. At a predominant capacitive impedance of the controller equipment, when $\beta<0$, the voltage $\bar{V}_s$ can be expressed by means of its relative amplitude $r=I_{ij}*X_c/V_i$ as described with reference to FIG. 6A, and its upper limiting value, also at a given current, is $r_{maxc}=I_{ij}*Kc*X_{FC}/V_i$. At a predominant inductive impedance of the controller equipment, when $\beta>0$, the voltage $\bar{V}_s$ can also be expressed in an analogous manner with the aid of its relative amplitude $r=I_{ij}*X_c/V_i$, and its upper limiting value, also at a given current, is $r_{maxi}=I_{ij}*Ki*X_{FC}/V_i$, where the factor Ki is a proportionality factor which may be regarded as an amplification factor. The factor Ki may, but need not, be equal to the factor Kc. In this case, lower limiting values $r_{minc}$ and $r_{mini}$, respectively, may also be applied to the voltage $\bar{V}_s$, corresponding to a situation where the capacitive and inductive impedance, respectively, of the controller equipment must not fall below finite values, $r_{minc}=I_{ij}*m_c*Kc*X_{FC}/V_i$, $r_{maxi}=I_{ij}*m_i*Ki*X_{FC}/V_i$, where $m_c$ and $m_i$ are factors<1.

The voltage $\bar{V}_s$ can thus, at a given current $\bar{I}_{ij}$, assume a first control value, the phase angle $\beta$ of which has the value $-\pi/2$ relative to this current, and the amplitude $V_s$ of which is controllable in relation to a first upper limiting value $V_{smaxc}=I_{ij}*Kc*X_{FC}$, and a second control value, the phase angle $\beta$ of which has the value $\pi/2$ relative to this current, and the amplitude $V_s$ of which is controllable in relation to a second upper limiting value $V_{smaxi}=I_{ij}*Ki*X_{FC}$. The first upper limiting value in voltage, $V_{smaxc}$, corresponds to a first upper limiting value $X_{cmaxc}$ in impedance of a capacitive nature, $X_{cmaxc}=Kc*X_{FC}$, and the second upper limiting value in voltage, $V_{smaxi}$, corresponds to a second upper limiting value $X_{cmaxi}$ in impedance of an inductive nature, $X_{cmaxi}=Ki*X_{FC}$, the impedance $X_c$ of the controller equipment being controllable in relation to the first and second upper limiting values in impedance.

In a manner known, a general expression for the total energy v of an electromechanical system may be formed as the sum of its kinetic and potential energies. In the event that power oscillations occur in such a system, as a criterion for all of these oscillations to be damped it is further assumed that the total energy of the system under consideration during the damping process must decrease, that is, the time rate of change d(v)/dt of its energy is to fulfill the condition d(v)/dt<0.

Now, it is advantageous, on the basis of the model described with reference to FIG. 3, to consider the contribution from the controller equipment in a way that half of the reactive power, which the controller equipment adds to the system, is added to the expression for the potential energy of the system. In this way, simple and uniform control laws are obtained, based on quantities in the power network at the connection points of the controller equipment in the power line, for damping power oscillations in the system for the embodiments of the controller equipment described above.

The time rate of change of the energy for these embodiments are calculated based on the expressions, derived above, for the supplied apparent powers $S_{si}$ and $S_{sj}$. A calculation shows that in all cases the expression for the time rate of change of the total energy contains a term of the form $$P_{sj}\frac{d}{dt}(\theta_i-\theta_j).$$

That is to say, d(v)/dt is a function F of this term and, depending on which embodiment of the invention is considered, the other variables included in the expressions for Psj and $Q_{sj}$:

$$d(\vartheta)/dt = F\left[P_{sj}\frac{d}{dt}(\theta_i-\theta_j), Q_{sj}, V_i, V_j, r, b_s, K_{cs}\right] \quad (5)$$

Simulation of power systems together with the embodiments of the controller equipment described above has shown that the term $$P_{sj}\frac{d}{dt}(\theta_i-\theta_j)$$

has the predominant influence in the expression of the time rate of change of the energy, and therefore it is advantageous to control controller equipment of the kind mentioned in the introductory part of the description in such a way that the condition $$P_{sj}\frac{d}{dt}(\theta_i-\theta_j)<0$$

is fulfilled.

Physically, this condition means that the controller equipment in dependence on the control order is to generate a voltage in the power line, which feeds an active power therein to counteract the changes in active power in the power line associated with power oscillations in the power system.

The use of the above expressions of the power Psj for the described embodiments of the controller equipment and a calculation of values of the control parameters r, γ, $K_{cs}$ and β for these such that the absolute value of d(v)/dt becomes maximal, result in the following control laws. In the first embodiment of the invention, when the controller equipment comprises a unified power flow controller, the following control law is formulated:

$$\text{if } \frac{d}{dt}(\theta_i - \theta_j) < 0, \text{ set } r = r_{max} \text{ and } \gamma = -\pi/2 - (\theta_i - \theta_j) \quad (6a)$$

$$\text{if } \frac{d}{dt}(\theta_i - \theta_j) \geq 0, \text{ set } r = r_{max} \text{ and } \gamma = \pi/2 - (\theta_i - \theta_j) \quad (6b)$$

This means that the voltage $\overline{V}_s$ is to be controlled in magnitude, via the control order SO, to its upper limiting value whereas its angle relative to the voltage $\overline{V}_i$ at the first connection point is to be controlled so as to form either the angle $\pi/2$ or the angle $-\pi/2$ with the difference $(\theta_i-\theta_j)$ of the phase angle for the voltage at the first and the voltage at the second connection point, respectively.

In the second embodiment of the invention, when the controller equipment comprises a phase angle controller (PAR), the following control law is formulated:

$$\text{if } \frac{d}{dt}[\sin(\theta_i - \theta_j)] < 0, \text{ set } r = r_{max} \text{ and } \gamma = -\pi/2 \quad (7a)$$

$$\text{if } \frac{d}{dt}[\sin(\theta_i - \theta_j)] \geq 0, \text{ set } r = r_{max} \text{ and } \gamma = \pi/2 \quad (7b)$$

This means that the voltage $\overline{V}_s$ is to be controlled in magnitude, via the control order SO, to its upper limiting value whereas its angle relative to the voltage $\overline{V}_i$ at the first connection point is to be controlled so as to form either the angle $\pi/2$ or the angle $-\pi/2$ with the voltage $\overline{V}_i$.

In the third embodiment of the invention, when the controller equipment comprises a controllable series capacitor CSC according to FIG. 6A, the following control law is formulated:

$$\text{if } \frac{d}{dt}[\cos(\theta_i - \theta_j)] < 0, \text{ set } Kcs = Kcs_{max} \quad (8a')$$

$$\text{if } \frac{d}{dt}[\cos(\theta_i - \theta_j)] \geq 0, \text{ set } Kcs = Kcs_{min} \quad (8b')$$

With the above relationship and definitions, this control law, at a given current $\overline{I}_{ij}$ and a given voltage $\overline{V}_i$, may be reformulated to:

$$\text{if } \frac{d}{dt}[\cos(\theta_i - \theta_j)] < 0, \text{ set } Xc = X_{cmaxc} = Kc * X_{FC} \quad (8a)$$

$$\text{if } \frac{d}{dt}[\cos(\theta_i - \theta_j)] \geq 0, \text{ set } Xc = X_{cminc} = 0 \quad (8b)$$

This means that the series-capacitor equipment is to be controlled, via the control order SO, so as either to be completely disconnected or completely connected into the power line and that the voltage $\overline{V}_s$ between the connection points, which always makes an angle $\beta=-\pi/2$ (FIG. 2) with the current $\overline{I}_{ij}$ through the capacitors, changes between a lower and an upper limiting value, the lower limiting value according to the above being equal to zero and the upper being equal to $\overline{V}_{smaxc} = I_{ij} * Kc * X_{FC}$.

In the fourth embodiment of the invention, when the controller equipment comprises a controlled series capacitor CSC according to FIG. 6B, the following control law is formulated in an analogous manner:

$$\text{if } \frac{d}{dt}[\cos(\theta_i - \theta_j)] < 0, \text{ set } Xc = X_{cmaxc} = Kc * X_{FC}, \beta = -\pi/2 \quad (9a)$$

$$\text{if } \frac{d}{dt}[\cos(\theta_i - \theta_j)] \geq 0, \text{ set } Xc = X_{cminc} = Ki * X_{FC}, \beta = \pi/2 \quad (9b)$$

This means that the series capacitor equipment, via the control order SO and the phase angle control of the thyristor switching device, is to be controlled such that it either exhibits the chosen maximum impedance value of a capacitive nature or the chosen maximum impedance value of an inductive nature. The voltage $\overline{V}_s$ between the connection points $N_i$ and $N_j$ is controlled as to assuntrol order SO so as to assume magnitudes equal to one of its respective first upper and second upper limiting values, and so as to make the angle $-\pi/2$ or the angle $\pi/2$, respectively, with the current $\overline{I}_{ij}$.

In the third embodiment according to FIG. 6A, the factor Kc may assume discrete values whereas in the fourth embodiment according to FIG. 6B the factors Kc and Ki may assume continuous values within intervals determined by the values of the impedances of the components included in the controller equipment.

For all of the described embodiments, the control order is thus formed in dependence on the time rate of change of a function of the difference $(\theta_i-\theta_j)$ of the phase angle for the voltage of the first connection point and the phase angle for the voltage of the second connection point. This function may be ONE (equations 6a, 6b), the sine function (equations 7a, 7b) or the cosine function (equations 8a, 8b, 9a, 9b).

It has also proved to be advantageous to modify the control laws according to equations 6a, 6b, 7a, 7b, 8a, 8b, 9a and 9b with a stability criterion meaning that the amplitude of the voltage $\overline{V}_s$ is brought to decrease with a decreasing value of the absolute value of the time rate of change $$\frac{d}{dt}(\theta_i - \theta_j)$$

of the difference $(\theta_i-\theta_j)$ of the phase angle for the voltage of the first connection point and the phase angle for the voltage of the connection point, and, in addition thereto, to allow intervention from the controller equipment only in those cases where the absolute value mentioned above exceeds a chosen rate of change limit value (D).

$$\left|\left(\frac{d}{dt}(\theta_i - \theta_j)\right)\right| > D.$$

The control order is then modified to bring the controller equipment to generate a voltage whose amplitude is formed in dependence on a product of its upper limiting value and the absolute value of the time rate of change of the difference $(\theta_i-\theta_j)$.

In the first embodiment of the invention, when the controller equipment comprises a unified power flow regulator (UPFC), the following control law can thus be formulated:

$$\text{if } \frac{d}{dt}(\theta_i - \theta_j) < 0, \text{ set } r = TD * r_{max} \text{ and } \gamma = -\pi/2 - (\theta_i - \theta_j) \quad (6A)$$

$$\text{if } \frac{d}{dt}(\theta_i - \theta_j) \geq 0, \text{ set } r = TD * r_{max} \text{ and } \gamma = \pi/2 - (\theta_i - \theta_j) \quad (6B)$$

where TD assumes the value which is the greater of the value ONE and of the value of the absolute value of the time rate of change of the difference $(\theta_i-\theta_j)$, $$TD = \max\left\{1, \left|\left(\frac{d}{dt}(\theta_i - \theta_j)\right)\right|\right\}.$$

In the second embodiment of the invention, when the controller equipment comprises a phase angle regulator (PAR), the following control law can be formulated:

if $\frac{d}{dt}[\sin(\theta_i - \theta_j)] < 0$, set $r = TD * r_{\max}$ and $\gamma = -\pi/2$ (7A)

if $\frac{d}{dt}[\sin(\theta_i - \theta_j)] \geq 0$, set $r = TD * r_{\max}$ and $\gamma = \pi/2$ (7B)

where TD is defined in the same way as above.

In the third embodiment of the invention, when the controller equipment comprises series-capacitor equipment according to the embodiment according to FIG. 6A, the following control law can be formulated:

If $\frac{d}{dt}[\cos(\theta_i - \theta_j)] < 0$, set $Xc = TD * Kc * X_{FC}$ (8A)

If $\frac{d}{dt}[\cos(q_i - q_j)] \geq 0$, set $Xc = 0$ (8B)

where TD is defined in the same way as above.

In the fourth embodiment of capacitor equipment according to FIG. 6B, the following control law can be formulated:

If $\frac{d}{dt}[\cos(\theta_i - \theta_j)] < 0$, set $X_c = TD * Kc * X_{FC}, \beta = -\pi/2$ (9A)

If $\frac{d}{dt}[\cos(\theta_i - \theta_j)] \geq 0$, set $X_c = TD * Ki * X_{FC}, \beta = \pi/2$ (9B)

where TD is defined in the same way as above.

Figure 7:
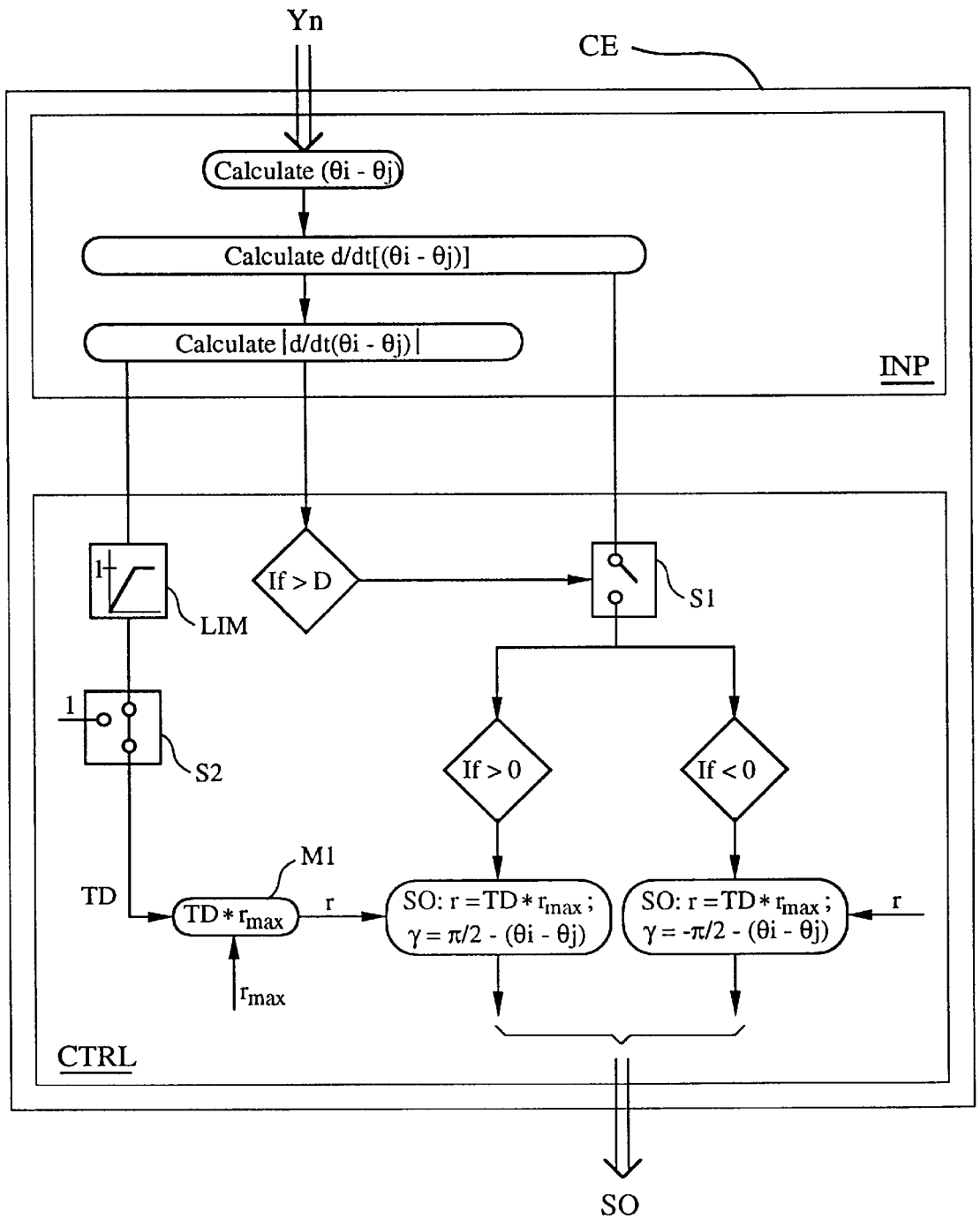
FIG. 7 shows schematically in the form of a flow diagram an embodiment of controlling equipment for an embodiment of controller equipment according to FIG. 4.

FIG. 7 illustrates in the form of a flow diagram an implementation of the control law according to equations 6A, 6B in the first embodiment of the invention, when the controller equipment comprises a unified power flow regulator (UPFC).

In FIG. 7 and in FIGS. 8, 9A and 9B described below, designations of quantities are used which occur in the power network, such as $\theta_i$, $\theta_j$, $\gamma$, $r$, $X_c$, $X_{FC}$. Further, the control order SO is expressed in quantities related to the power network. However, the controller equipment CE is, of course, adapted to operate with measured values and signals corresponding to these quantities and it is to be understood that these measured values and signals, to simplify the presentation, in these figures have been given the same designations as the quantities to which they correspond.

The controller equipment CE comprises an input member INP adapted, in dependence on the measured values Yn of the quantities sensed in the power network, to calculate, in some known manner, the phase deviation $(\theta_i-\theta_j)$, that is, the difference $(\theta_i-\theta_j)$ between the phase angle for the voltage $\overline{V}_i$ of the first nodal point and the phase angle for the voltage $\overline{V}_j$ of the second nodal point, as well as the time rate of change $$\frac{d}{dt}(\theta_i - \theta_j)$$

of the phase deviation and the absolute value $$\left|\left(\frac{d}{dt}(\theta_i - \theta_j)\right)\right|$$

of this rate of change. The absolute value of the rate of change is compared in the control member CTRL with a chosen rate of change limit value D and in the event that the absolute value of the rate of change is smaller than or equal to this rate of change limit value, no change of the control order is made. If, on the other hand, the absolute value of the rate of change is greater than this rate of change limit value, a check of the sign of the rate of change is performed in the control member. This is illustrated in the figure by a switch S1, when in this case, closes and supplies the rate of change to two comparing circuits for this sign determination. In the event that the rate of change is greater than zero, a control order SO is generated, which in some known way brings the controller equipment, that is, in this embodiment the converter CONV2 via the transformer T2 (FIG. 4), to generate in the power line L a voltage $\overline{V}_s$ with the relative amplitude $r=TD*r_{max}$ and the angle $\gamma=\pi/2-(\theta_i-\theta_j)$ with the voltage $\overline{V}_i$. The amplitude r is determined by the product of the upper limiting value $r_{max}$ for the relative amplitude and the absolute value of the time rate of change of the phase deviation. The formation of the relative amplitude r is illustrated in the figure by the value of the absolute value of the rate of change, in a limiting circuit LIM limited to the value ONE, in the form of a value TD is supplied to a multiplier M1, where it is multiplied by the value of $r_{max}$ which is also supplied to the multiplier. In the event that the rate of change is smaller than zero, a control order SO is generated which brings the controller equipment to generate in the power line a voltage $\overline{V}_s$ with the relative amplitude $r=TD*r_{max}$ and the angle $\gamma=-\pi/2-(\theta_i-\theta_j)$ with the voltage $\overline{V}_i$.

A switch S2, which, in the position shown in the figure, connects the absolute value, limited in amplitude, of the rate of change to the multiplier M1, but in reversed position connects a value ONE thereto, illustrates the case where the control law is generated without considering the stability criterion, in which case the relative amplitude is always given the value $r_{max}$.

Figure 8:
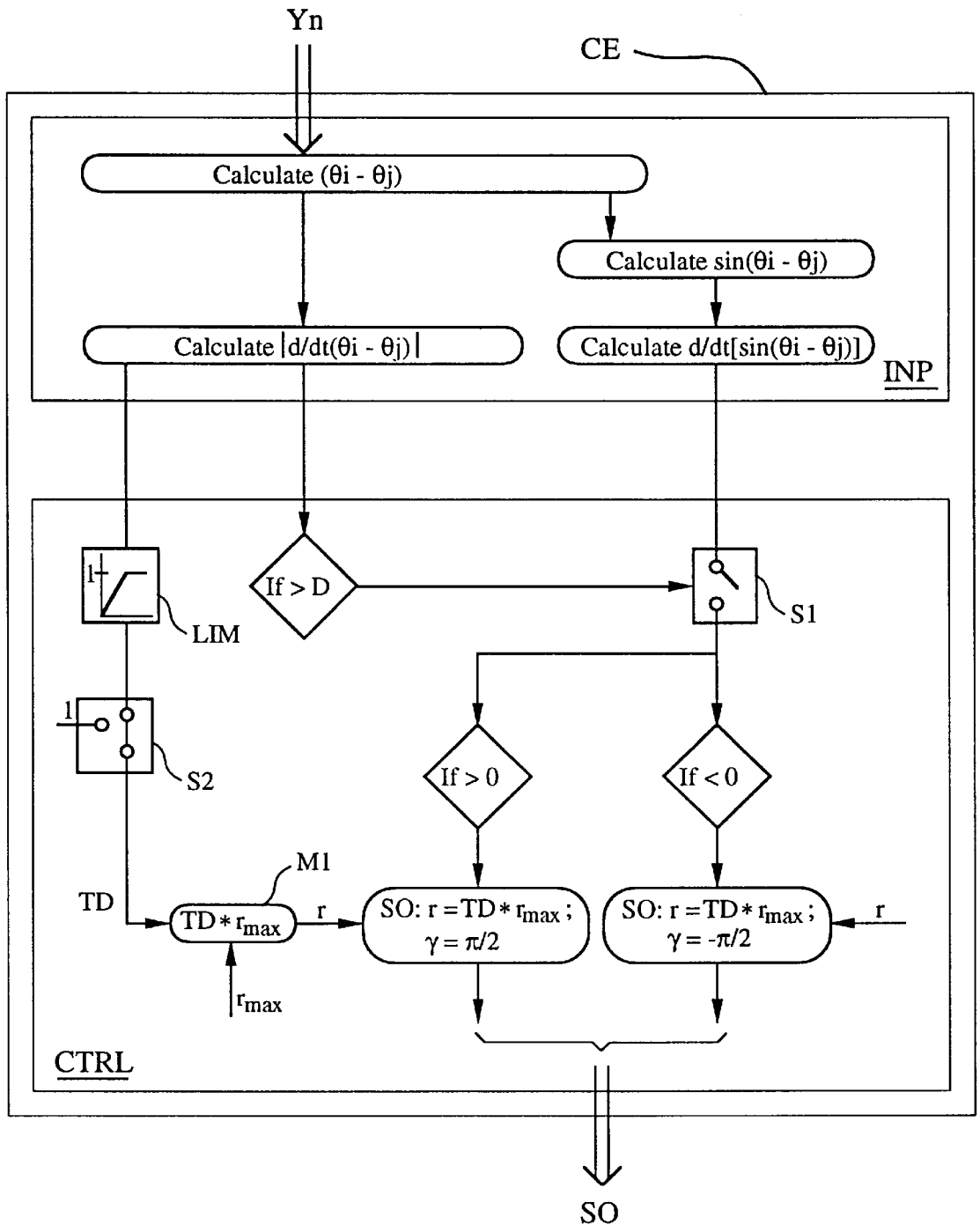
FIG. 8 shows schematically in the form of a flow diagram an embodiment of controlling equipment for an embodiment of controller equipment according to FIG. 5.

FIG. 8 illustrates in the form of a flow diagram an implementation of the control law according to equations 7A, 7B in the second embodiment of the invention, when the controller equipment comprises a phase angle regulator (PAR). The controlling equipment and the flow diagram according to which this equipment is operating are, in this embodiment, arranged in a way similar to that described with reference to FIG. 7. However, the input member INP in this embodiment is adapted, in dependence on the measured values Yn, in some known manner to derive, in addition to the phase deviation and the absolute value of the rate of change of the phase deviation, the sine function $\sin(\theta_i-\theta_j)$ for the phase deviation and the time rate of change $$\frac{d}{dt}[\sin(\theta_i - \theta_j)]$$

of this sine function, whereby, in the event that the absolute value of the rate of change of the phase deviation is greater than the rate of change limit value D, the control order is formed in dependence on the sign of the rate of change of the sine function of the phase deviation. Further, the voltage $\overline{V}_s$, generated in the power line L via the transformer T4 (FIG. 5), with the relative amplitude $r=TD*r_{max}$ is controllable with respect to its phase angle to either the angle $\gamma=\pi/2$ or the angle $\gamma=-\pi/2$ with the voltage $\overline{V}_i$.

Figure 9A:
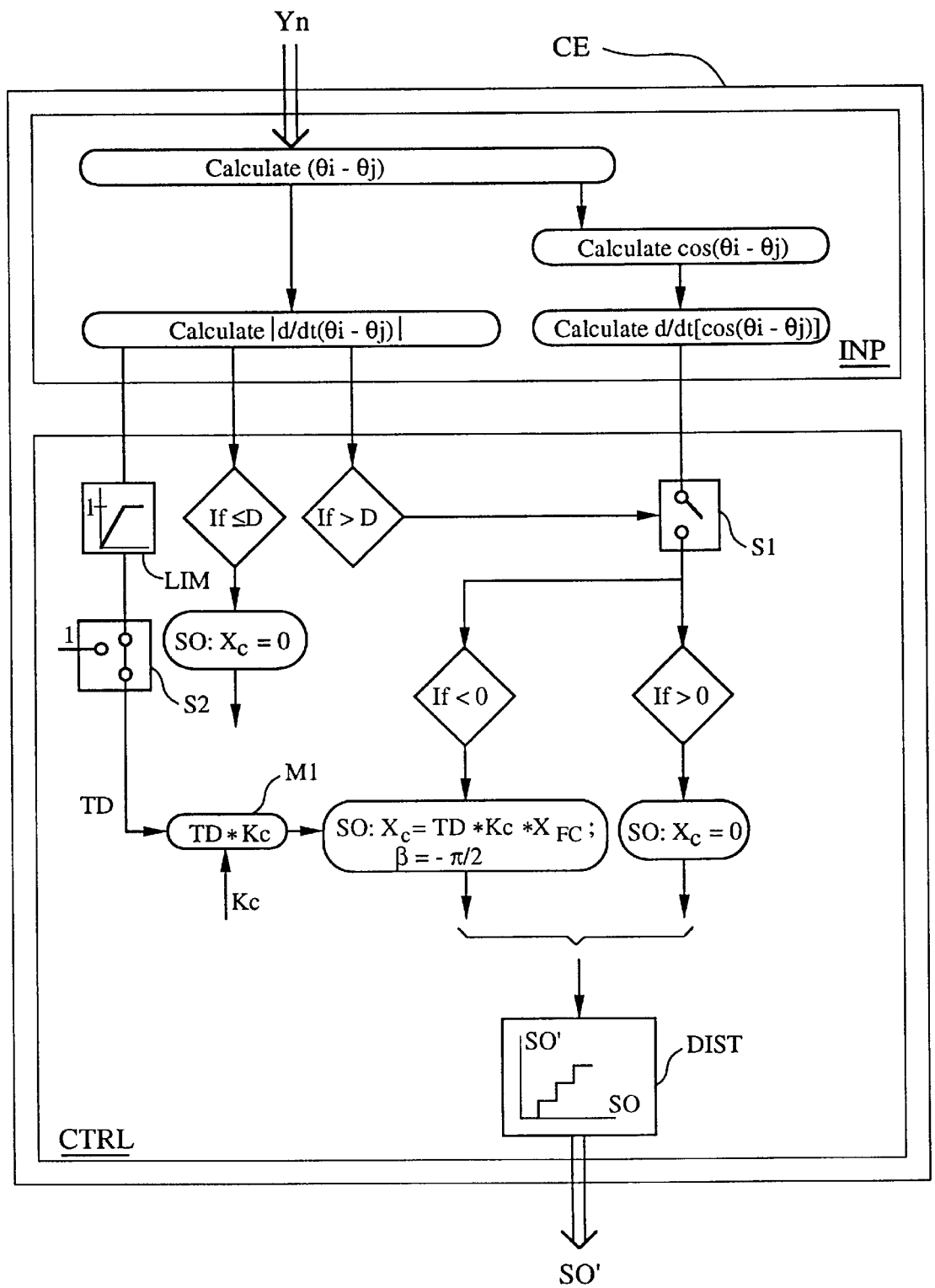
FIG. 9A shows schematically in the form of a flow diagram an embodiment of controlling equipment for an embodiment of controller equipment according to FIG. 6A.

FIG. 9A illustrates in the form of a flow diagram an implementation of the control law according to equations 8A,8B in the third embodiment of the invention, when the controller equipment comprises series-capacitor equipment according to the embodiment according to FIG. 6A. The controlling equipment and the flow diagram according to which this equipment is operating are, in this embodiment, arranged in a way similar to that described with reference to FIG. 8, however with the difference that, instead of the sine function of the phase deviation, the cosine function cosine $(\theta_i-\theta_j)$ thereof and the time rate of change thereof are utilized. Since, in this case the controller equipment is controllable by influencing its impedance $X_c$, the generation of the control order in the figure is shown as an order for a certain value $X_c$ of this impedance. In the event that the absolute value of the rate of change of the phase deviation is smaller than or equal to the rate of change limit value D, the impedance of the controller equipment is set at its minimum value, in this case equal to zero. In the event that the absolute value of the rate of change of the phase deviation is greater than the rate of change limit value D, the impedance of the controller equipment, in dependence on the sign of the rate of change of the cosine function of the phase deviation, is set either at a minimum value equal to zero or at a value $X_c=TD*Kc*X_{FC}$, where the amplification factor Kc has an analog function with the value $r_{max}$ according to FIGS. 7–8. When the factor TD at low amplitudes of the power oscillation assumes values<1, this means that, in the event that the rate of change of the cosine function of the phase deviation is smaller than zero, only a certain part of the controllable part of the controller equipment is to be connected to the power line. In this embodiment, a distributor unit DIST is arranged in the control member and adapted, in some known manner and in dependence on the requested value of the impedance Xc, to modify the control order SO to a discrete control order SO', which influences the switching members SW1, SW2 and SW3 in a way that that combination of capacitors C1–C3 is connected which provide an impedance value nearest the requested value Xc, such that the difference between the impedance exhibited by the controller equipment and the value of the impedance requested by the controlling equipment is minimized. This is illustrated in the figure by a relationship SO–SO' depicted as a stepped function.

Figure 9B:
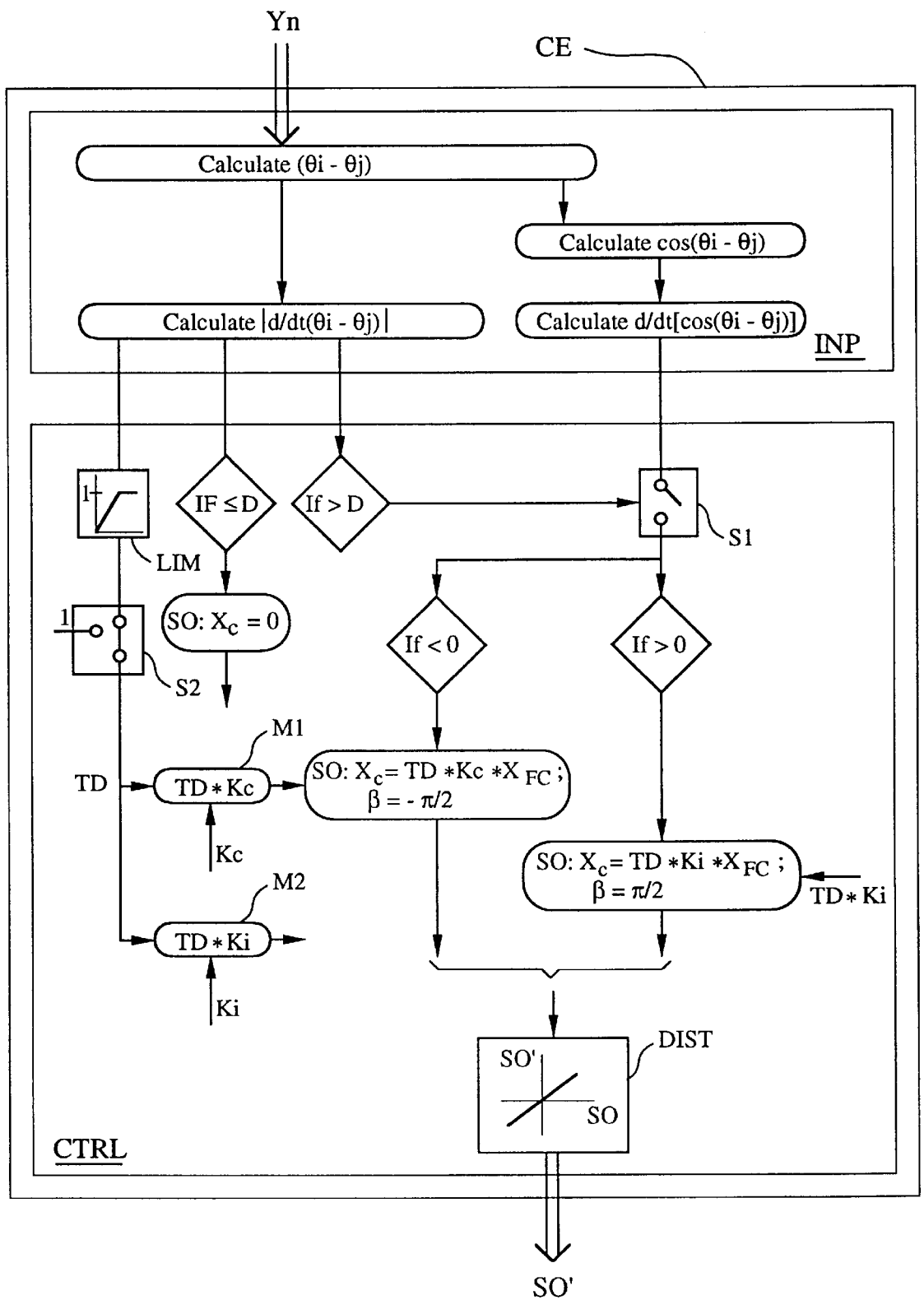
FIG. 9B shows schematically in the form of a flow diagram an embodiment of controlling equipment for an embodiment of controller equipment according to FIG. 6B.

FIG. 9B illustrates in the form of a flow diagram an implementation of the control law according to equations 9A, 9B in the fourth embodiment of the invention, when the controller equipment comprises series-capacitor equipment according to FIG. 6B. The controlling equipment and the flow diagram according to which this equipment is operating are, in this embodiment, arranged in a way similar to that described with reference to FIG. 9A, however, with the difference that, in the event that the absolute value of the rate of change of the phase deviation is greater than the rate of change limit value D, the impedance of the controller equipment, in dependence on the sign of the rate of change of the cosine function of the phase deviation, is set either at a value $X_c=TD*Kc*X_{FC}$ with an angle $\beta=-\pi/2$ or at a value $X_c=TD*Ki*X_{FC}$ with an angle $\beta=p/2$. The product TD*Kc is formed in a multiplier M1 and the product TD*Ki in a multiplier M2. The relationship SO–SO' in the distributor unit DIST is in this case illustrated by a linear function which may assume both positive and negative values, indicating that the voltage generated in the power line by the controller equipment may shift phase positions between the values $-\pi/2$ and $\pi/2$.

The quantities Yn sensed in the power network, of which measured values are supplied to the input member INP arranged in the controlling equipment, may, for example, consist of power values, current and voltage values or direct sensings of the phase angles $\theta_i$ and $\theta_j$, whereby the input member is adapted, in some manner known to one skilled in the art, in dependence on these quantities and on known network data, to calculate the desired phase deviation $(\theta_i-\theta_j)$ between the voltages $\overline{V}_i$ and $\overline{V}_j$ at the first and second connection points, as well as the time rate of change $$\frac{d}{dt}(\theta_i - \theta_j)$$

of the phase deviation and the absolute value of this rate of change.

Figure 10:
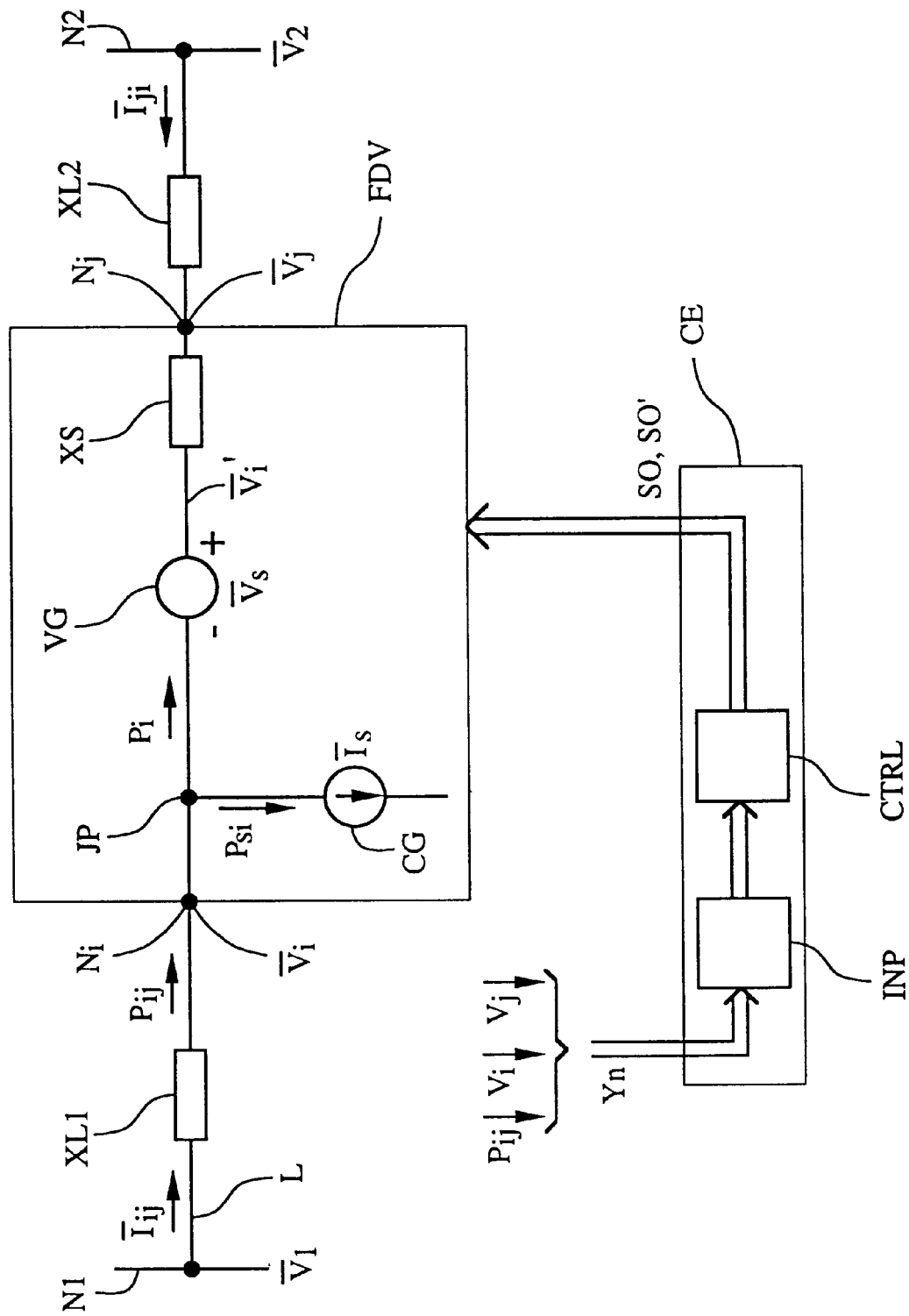
FIG. 10 shows schematically an example of sensing of quantities in a power network for an embodiment of the invention according to FIG. 6A.

FIG. 10 shows as an example of how the phase deviation may be formed from sensed values of voltages and of active power. The figure is the same as FIG. 1, but with the difference that in FIG. 10 the active power $P_{ij}$ which flows in a direction from the first nodal point N1 into the first connection point $N_i$, the active power $P_{si}$ which flows from the connection point JP through the current generator CG, and the active power $P_i$ which flows from the connection point JP through the voltage generator VG in a direction towards the second connection point $N_j$ are marked.

The following applies:

$$P_{ij}=P_{si}+P_i. \tag{10a}$$

For the first and for the second embodiment of the invention, the following is obtained from equation 1a and generally known expressions from electrotechnology $$P_{ij}=rb_sV_iV_j\sin(\theta_i-\theta_j+\gamma)+b_sV_iV_j\sin(\theta_i-\theta_j) \tag{10b}$$

The quantities Yn which are sensed in the power network are in this case the active power $P_{ij}$ at the first connection point and the voltages $V_i$ and $V_j$ at, respectively, the first and the second connection point. The quantities r and $\gamma$ are known from the latest value of the control order, whereas the quantity $b_s$ is known from manufacturing data for the controller equipment. The input member INP may be adapted in some known manner to calculate the difference $(\theta_i-\theta_j)$ from equation 10b.

For the third and fourth embodiments of the invention the following applies:

$$P_{si}=0$$

and $$P_{ij}=V_iV_j\sin(\theta_i-\theta_j)/(X_c-X_s) \tag{10c}$$

The quantities Yn which are sensed in the power network are in this case the same as in the first and second embodiments of the invention. The quantity $X_c$ is known from the latest value of the control order, whereas the quantity $X_s=1/b_s$ is known from manufacturing data or measured data for the controller equipment.

The invention is not limited to the embodiments shown but a plurality of modifications are feasible within the scope of the inventive concept. Thus, for example, the input member and the control member may be designed wholly or partially as hard-wired, analogically or digitally operating circuits, designed for this particular purpose, or by a microprocessor programmed according to the principles indicated in FIGS. 7–9. In this connection, of course, the input unit and the control member may also be wholly or partially integrated with each other.

The current generator CG may, especially in the first embodiment of the invention, be arranged controllable in that the converter CONV1 may be arranged to influence the voltage at the connection point JP in a way corresponding to that for equipment for static compensation of reactive power (SVC).

As a measure of the intervention of the controller equipment, the relative amplitude r may alternately, and in particular in the second embodiment of the invention, be replaced by the angle $\Phi$ made by the voltage $\overline{V}_i{}'$ with the voltage $\overline{V}_i$ (FIG. 2).

In the third embodiment described with reference to FIG. 6A, the series-capacitor equipment may, of course, comprise fewer or more capacitors C1, C2, C3, C4 . . . , each one with an associated switching member SW1, SW2, SW3, SW4, . . .

The controller equipment may also be arranged at or near one of the nodal points of the power network, for example the first one, in which case the impedance between this nodal point and the first connection point facing the nodal point becomes low or negligible. The difference $(\theta_i-\theta_j)$ between the phase angles for the voltages at the connection points may then in certain cases, from a practical point of view, be replaced by the difference $(\theta_1-\theta_j)$ between the phase angles for the voltages at the first nodal point and the second connection point.

The control laws according to the invention are based on local values of sensed quantitites in the power network, which values currently occur at the controller equipment. In this way, and by the application of the control laws to pieces of controller equipment serially connected in the power line, a fast and cost-effect damping of the power oscillations can be achieved.

I claim:

1. An apparatus for control of controller equipment, said controller equipment being serially connected between a first and a second connection point in a power line in an electric network for alternating current, said controller equipment being adapted to serially generate in said power line, dependent on a control order, a damping voltage for damping power oscillations in said power line, said apparatus comprising:

controlling equipment receiving sensed quantities of said power network and forming in dependence on said quantities a phase deviation as the difference between a phase angle of a first voltage at said first connection point and a phase angle of a second voltage at said second connection point, said controlling equipment forming said control order dependent on the time rate of change of a function of said phase deviation, whereby said controller equipment generates said damping voltage which feeds an active power in said power line counteracting changes in active power in said power line which are associated with power oscillations, and wherein said damping voltage has an amplitude controllable in relation to a first upper limiting value and a phase angle controllable relative to said first voltage, and said control order being formed so that if an absolute value of the time rate of change of said phase deviation exceeds a predetermined limit value, said amplitude is formed dependent on said first upper limiting value and said phase angle is equal to the difference between $-\pi/2$ and said phase deviation if said time rate of change of said phase deviation is smaller than zero, and said phase angle is equal to the difference between $\pi/2$ and said phase deviation if said time rate of change of said phase deviation is greater than zero.

2. An apparatus for control of controller equipment, said controller equipment being serially connected between a first and a second connection point in a power line in an electric network for alternating current, said controller equipment being adapted to serially generate in said power line, dependent on a control order, a damping voltage for damping power oscillations in said power line, said apparatus comprising:

controlling equipment receiving sensed quantities of said power network and forming in dependence on said quantities a phase deviation as the difference between a phase angle of a first voltage at said first connection point and a phase angle of a second voltage at said second connection point, said controlling equipment forming said control order dependent on the time rate of change of a function of said phase deviation, whereby said controller equipment generates said damping voltage which feeds an active power in said power line counteracting changes in active power in said power line which are associated with power oscillations, and wherein said damping voltage has an amplitude controllable with respect to a first upper limiting value and a phase angle which, relative to said first voltage, assumes a value of either of $-\pi/2$ and $\pi/2$, and said control order is formed so that when an absolute value of the time rate of change of said phase deviation exceeds a predetermined limit value, said amplitude is formed dependent on said first upper limiting value and said phase angle is equal to $-\pi/2$ if a time rate of change of the sine function of said phase deviation is smaller than zero, and said phase angle is equal to $\pi/2$ if said time rate of change of the sine function of said phase deviation is greater than zero.

3. An apparatus according to claim 1 wherein said control order is formed such that said amplitude of said damping voltage is dependent on a product of said first upper limiting value and said absolute value of said time rate of change of said phase deviation.

4. An apparatus according to claim 1 wherein said control order is formed such that said amplitude of said damping voltage is equal to said first upper limiting value.

5. An apparatus according to claim 2 wherein said control order is formed such that said amplitude of said damping voltage is dependent on a product of said first upper limiting value and said absolute value of said time rate of change of said phase deviation.

6. An apparatus according to claim 2 wherein said control order is formed such that said amplitude of said damping voltage is equal to said first upper limiting value.

7. An apparatus for control of controller equipment, said controller equipment being serially connected between a first and a second connection point in a power line in an electric network for alternating current, said controller equipment being adapted to serially generate in said power line, dependent on a control order, a damping voltage for damping power oscillations in said power line, said apparatus comprising:

controlling equipment receiving sensed quantities of said power network and forming in dependence on said quantities a phase deviation as the difference between a phase angle of a first voltage at said first connection point and a phase angle of a second voltage at said second connection point, said controlling equipment forming said control order dependent on the time rate of change of a function of said phase deviation, whereby said controller equipment generates said damping voltage which feeds an active power in said power line counteracting changes in active power in said power line which are associated with power oscillations, and wherein, at a current through said power line at said first connection point, said damping voltage may assume either of a first control value, a phase angle of which is equal to $-\pi/2$ relative to said current, and a second control value, a phase angle of which is equal to $\pi/2$ relative to said current, an amplitude of said first and second control values being controllable in relation to a first upper limiting value and a second upper limiting value, respectively, and wherein when an absolute value of a time rate of change of said phase deviation exceeds a predetermined limit value, said control order is formed so that said damping voltage is equal to said first control value if the time rate of change of the cosine function of said phase deviation is smaller than zero, and said damping voltage is equal to said second control value if said time rate of change of the cosine function of said phase deviation is greater than zero.

8. An apparatus according to claim 7 wherein said amplitude of said first control value is dependent on a product of said first upper limiting value and said absolute value of said time rate of change of said phase deviation, and said amplitude of said second control value is dependent on a product of said second upper limiting value and said absolute value of said time rate of change of said phase deviation.

9. An apparatus according to claim 7 wherein said first upper limiting value is a function of said current, a predetermined reactance value and a first amplification value, and said second upper limiting value is a function of said current, said predetermined reactance value and a second amplification value.

10. An apparatus according to claim 7 wherein said control order is formed to bring said amplitude of said second control value to zero.

11. An apparatus for damping power oscillations in a power line in an electric network for alternating current, said apparatus comprising:

controller equipment serially connected between a first and a second connection point in said power line, said controller equipment comprises a series capacitor connected in parallel with a series connection of a reactor and a thyristor switching device, wherein phase angle control of said reactor is dependent on a control order, and by said phase angle control, an impedance of said controller equipment is controllable in relation to a first upper limiting value of a capacitive type and a second upper limiting value of an inductive type; and controlling equipment receiving sensed quantities of said power network and forming in dependence on said quantities a phase deviation as the difference between a phase angle of a first voltage at said first connection point and a phase angle of a second voltage at said second connection point, said controlling equipment forming said control order such that when an absolute value of the time rate of change of said phase deviation exceeds a pre-determined limit value, said controller equipment exhibits an impedance of a capacitive type formed in dependence on said first upper limiting value if the time rate of change of the cosine function of said phase deviation is smaller than zero and exhibits an impedance of an inductive type formed in dependence on said second upper limiting value if the time rate of change of the cosine function of said phase deviation is greater than zero.

12. An apparatus according to claim 11 wherein said impedance of a capacitive type is dependent on a product of said first upper limiting value and said absolute value of said time rate of change of said phase deviation, and said impedance of an inductive type is dependent on a product of said second upper limiting value and said absolute value of said time rate of change of said phase deviation.

13. An apparatus according to claim 11 wherein said first upper limiting value is a product of a reactance value and a first amplification factor and said second upper limiting value is a product of said reactance value and a second amplification factor.

14. An apparatus for damping power oscillations in a power line in an electric network for alternating current, said apparatus comprising:

controller equipment arranged between a first and a second connection point in said power line, said controller equipment comprises a plurality of series connected capacitors, each said capacitor connected in parallel with a switching member whereby an impedance of said controller equipment assumes an upper limiting value which is the product of a predetermined reactance value and an amplification factor, and a lower limiting value equal to zero, by connecting and bypassing said capacitors in said power line via said switching members in dependance on a control order; and controlling equipment receiving sensed quantities of said power network and forming in dependence on said quantities a phase deviation as the difference between a phase angle of a first voltage at said first connection point and a phase angle of a second voltage at said second connection point, said controlling equipment forming said control order such that when an absolute value of the time rate of change of said phase deviation exceeds a pre-determined limit value, said controller equipment exhibits an impedance formed dependent on said upper limiting value if the time rate of change of the cosine function of said phase deviation is smaller than zero and exhibits an impedance equal to said lower limiting value if the time rate of change of the cosine function of said phase deviation is greater than zero.

15. An apparatus according to claim 14 wherein said control order causes said controller equipment to exhibit an impedance formed dependent on a product of said upper limiting value and said absolute value of said time rate of change of said phase deviation.

16. An apparatus according to claim 15 wherein said control order is formed such that said controller equipment exhibits an impedance which minimizes a difference between this impedance and said impedance formed dependent on a product of said upper limiting value and said absolute value of said time rate of change of said phase deviation.

* * * * *